United States Patent
Kulkarni et al.

(10) Patent No.: US 11,598,225 B2
(45) Date of Patent: Mar. 7, 2023

(54) SYSTEM AND METHOD FOR REDUCING THE VISIBILITY OF EXHAUST EMISSIONS IN A GAS TURBINE SYSTEM

(71) Applicant: General Electric Company, Schenectady, NY (US)

(72) Inventors: Parag Prakash Kulkarni, Niskayuna, NY (US); Szymon Pawel Modelski, Untersiggenthal (CH); Craig A. Matis, Clifton Park, NY (US); Naresh Kumar Amineni, Altamont, NY (US)

(73) Assignee: General Electric Company, Schenectady, NY (US)

( * ) Notice: Subject to any disclaimer, the term of this patent is extended or adjusted under 35 U.S.C. 154(b) by 268 days.

(21) Appl. No.: 16/890,990

(22) Filed: Jun. 2, 2020

(65) Prior Publication Data

US 2021/0372623 A1    Dec. 2, 2021

(51) Int. Cl.
*F01D 25/30* (2006.01)
*F02C 3/30* (2006.01)
(Continued)

(52) U.S. Cl.
CPC ......... *F01D 25/305* (2013.01); *F01D 21/003* (2013.01); *F02C 3/30* (2013.01);
(Continued)

(58) Field of Classification Search
CPC ...... F01D 25/305; F02C 3/30; F05D 2270/08; F05D 2270/0831; F23J 15/00; F23J 15/03
See application file for complete search history.

(56) References Cited

U.S. PATENT DOCUMENTS

| 5,272,867 | A | 12/1993 | Emsperger |
| 8,790,609 | B1 | 7/2014 | Sobolevskiy |
(Continued)

FOREIGN PATENT DOCUMENTS

| EP | 3112616 A1 | 1/2017 |
| EP | 3228848 A1 | 10/2017 |
(Continued)

OTHER PUBLICATIONS

European Extended Search Report; EP Application No. 21174182.2 dated Feb. 22, 2022; 11 pages.

*Primary Examiner* — Scott J Walthour
(74) *Attorney, Agent, or Firm* — Fletcher Yoder, P.C.

(57) ABSTRACT

An emissions control system for a gas turbine system includes a reducing agent supply, at least one sensor, at least one valve, and a controller. The reducing agent supply has one or more conduits configured to couple to one or more fluid pathways of the gas turbine system, which are fluidly coupled to a flow path of an exhaust gas from a combustor through a turbine of the gas turbine system. The at least one sensor is configured to obtain a feedback of one or more parameters of the gas turbine system, which are indicative of a visibility of emissions of the exhaust gas. The at least one valve is coupled to the reducing agent supply. The controller is communicatively coupled to the at least one sensor and the at least one valve, such that, in response to the feedback, the controller adjusts the at least one valve to adjust a flow of the reducing agent to reduce the visibility of the emissions of the exhaust gas.

21 Claims, 8 Drawing Sheets

(51) Int. Cl.
    *F01D 21/00*     (2006.01)
    *F02C 6/08*     (2006.01)
    *F02C 7/18*     (2006.01)
    *F23J 15/00*     (2006.01)

(52) U.S. Cl.
    CPC ............... *F02C 6/08* (2013.01); *F02C 7/18* (2013.01); *F23J 15/003* (2013.01); *F05D 2260/232* (2013.01); *F05D 2260/606* (2013.01); *F05D 2270/08* (2013.01); *F05D 2270/0831* (2013.01); *F05D 2270/303* (2013.01); *F05D 2270/306* (2013.01); *F05D 2270/54* (2013.01); *F23J 2215/101* (2013.01); *F23J 2215/20* (2013.01); *F23J 2219/10* (2013.01)

(56) References Cited

U.S. PATENT DOCUMENTS

2010/0287906 A1* 11/2010 Xia .................... G01K 11/3206 385/13
2017/0292424 A1* 10/2017 Kippel ...................... F02C 9/48

FOREIGN PATENT DOCUMENTS

| | | |
|---|---|---|
| EP | 3354867 A1 | 8/2018 |
| EP | 3604770 A1 | 2/2020 |
| JP | H0255835 A | 2/1990 |
| KR | 101277518 B1 | 6/2013 |
| KR | 20140043428 A | 4/2014 |
| KR | 20140110305 A | 9/2017 |
| KR | 101807996 B1 | 12/2017 |

\* cited by examiner

SYSTEM AND METHOD FOR REDUCING THE VISIBILITY OF EXHAUST EMISSIONS IN A GAS TURBINE SYSTEM

BACKGROUND

The subject matter disclosed herein relates to gas turbine systems and, more particularly, to systems and methods for reducing the visibility of exhaust emissions, such as a yellow plume.

A gas turbine system may include a gas turbine engine having a compressor, a combustor, and a turbine driven by combustion gases from the combustor. Combustion of fuel in the combustor generates various exhaust emissions, such as nitrogen oxides ($NO_x$), sulfur oxides ($SO_x$), particulate matter, and other pollutants. Unfortunately, some of these exhaust emissions may be visible (e.g., a yellow plume) when discharged from the gas turbine system into the atmosphere under some operating conditions, such as start-up when the downstream emission control systems (e.g., carbon monoxide (CO) and selective catalytic reduction (SCR) catalysts) may not be fully functional. Accordingly, as emission regulations and community awareness are getting stricter in some parts of the world, a need exists for reducing concentrations of exhaust emissions and the corresponding visibility of such emissions being exhausted into the atmosphere.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

An embodiment of the disclosed subject matter includes an emissions control system for a gas turbine system having a reducing agent supply, at least one sensor, at least one valve, and a controller. The reducing agent supply has one or more conduits configured to couple to one or more fluid pathways of the gas turbine system, wherein the one or more fluid pathways are fluidly coupled to a flow path of an exhaust gas from a combustor through a turbine of the gas turbine system. The at least one sensor is configured to obtain a feedback of one or more parameters of the gas turbine system, wherein the one or more parameters are indicative of a visibility of emissions in the exhaust gas. The at least one valve is coupled to the reducing agent supply. The controller is communicatively coupled to the at least one sensor and the at least one valve, wherein the controller is responsive to the feedback to adjust the at least one valve to adjust a flow of the reducing agent to reduce the visibility of the emissions of the exhaust gas.

An embodiment of the disclosed subject matter includes a controller configured to communicatively couple to at least one sensor and at least one valve of an emissions control system of a gas turbine system. The controller is configured to receive a feedback of one or more parameters of the gas turbine system, wherein the one or more parameters are indicative of a visibility of emissions in an exhaust gas from the gas turbine system. The controller is responsive to the feedback to adjust the at least one valve to adjust a flow of a reducing agent from a reducing agent supply to one or more fluid pathways of the gas turbine system to reduce the visibility of the emissions of the exhaust gas. The one or more fluid pathways are fluidly coupled to a flow path of the exhaust gas from a combustor through a turbine of the gas turbine system.

An embodiment of the disclosed subject matter includes a method, which includes receiving a feedback, via at least one sensor of an emissions control system, of one or more parameters of a gas turbine system, wherein the one or more parameters are indicative of a visibility of emissions in an exhaust gas from the gas turbine system. The method also includes adjusting at least one valve, via a controller of the emissions control system, to adjust a flow of a reducing agent from a reducing agent supply to one or more fluid pathways of the gas turbine system to reduce the visibility of the emissions of the exhaust gas, wherein the one or more fluid pathways are fluidly coupled to a flow path of the exhaust gas from a combustor through a turbine of the gas turbine system.

BRIEF DESCRIPTION OF THE DRAWINGS

These and other features, aspects, and advantages of the present system will become better understood when the following detailed description is read with reference to the accompanying drawings in which like characters represent like parts throughout the drawings, wherein.

DETAILED DESCRIPTION

Figure 1:
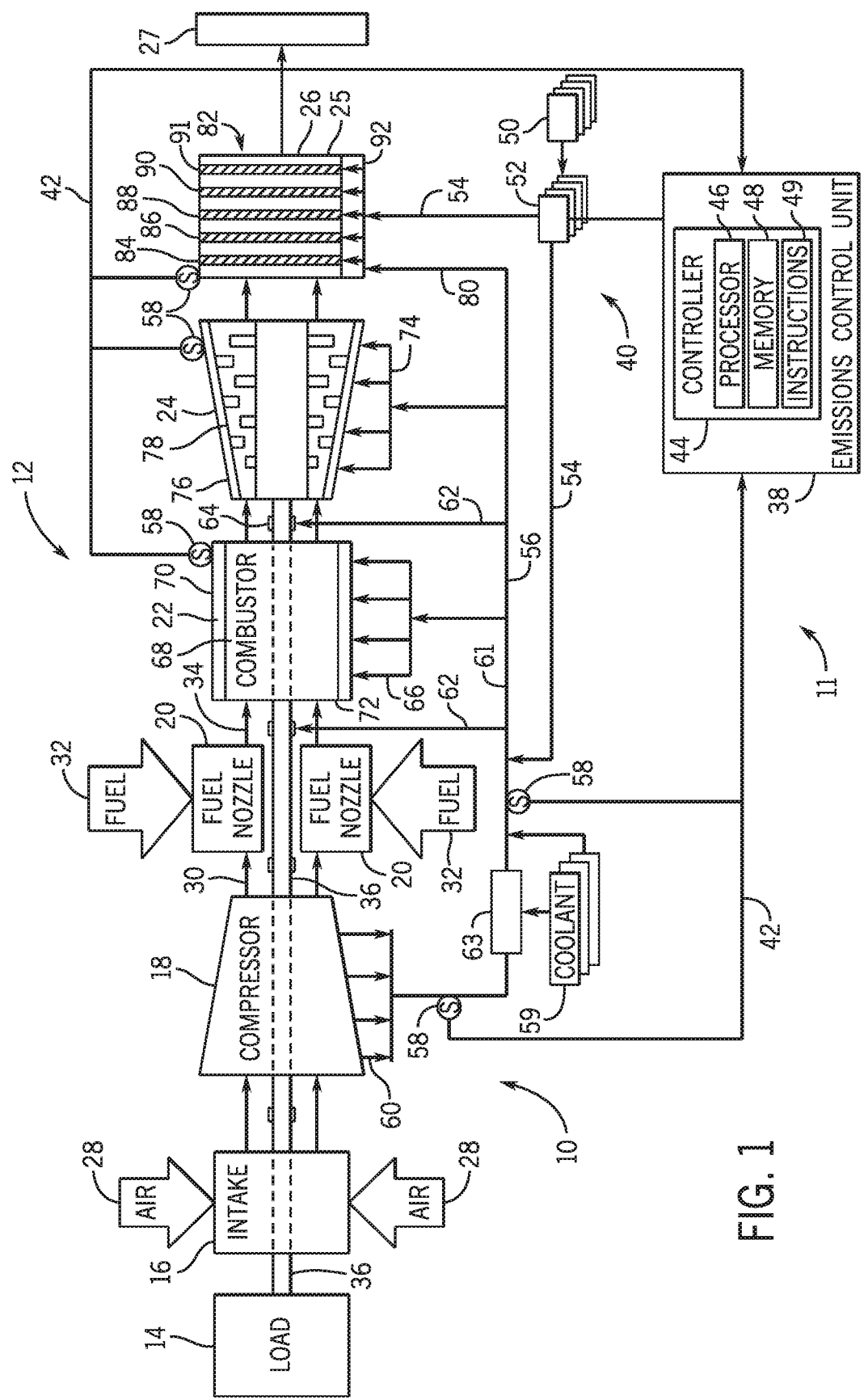
FIG. 1 is a block diagram of an embodiment of a gas turbine system having an emissions control system to reduce a visibility of exhaust emissions.

One or more specific embodiments of the present system will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The disclosed embodiments are directed toward systems and methods to reduce exhaust emissions, and a corresponding visibility of such exhaust emissions, in a gas turbine system. The exhaust emissions may include any undesirable pollutants or emissions that are visible in an exhaust being discharged from the gas turbine system. For example, the exhaust emissions may include nitrogen oxides ($NO_x$), sulfur oxides ($SO_x$), particulate matter, and other pollutants. The visible emissions may have a variety of colors depending on the type and concentration of the exhaust emissions. For example, the visible emissions may be yellow (e.g., a yellow plume) when the concentration of nitrogen oxides (e.g., nitrogen dioxide ($NO_2$)) exceed a threshold level.

The disclosed embodiments include an emissions control system and associated method to reduce the concentration and visibility of such exhaust emissions by, for example, supplying a reducing agent into one or more fluid pathways of the gas turbine engine (e.g., a cooling circuit or a bypass circuit). For example, the cooling circuit may extend through various parts of the gas turbine system that typically heat up during operation and/or that benefit from cooling to improve performance or extend the life of the parts. For example, the cooling circuit may include one or more cooling flow paths that extend along and/or through portions of the combustor (e.g., framework, combustor liner, head end, etc.), rotating parts (e.g., shaft, bearings, seals, etc.), portions of the turbine (e.g., rotating turbine blades, stationary turbine vanes, turbine nozzles, turbine wheels, turbine casings, etc.), or any other parts of the gas turbine system exposed to the heat of combustion or exhaust gases. The bypass circuit may include bypass lines coupled to the compressor (e.g., one or more compressor stages) and other portions of the gas turbine system (e.g., one or more turbine stages of the turbine).

The reducing agent flows through these fluid pathways and eventually enters a flow path of the exhaust gas, wherein the reducing agent is then able to help reduce the concentration of the exhaust emissions and the corresponding visibility of such exhaust emissions. By using the fluid pathways of the gas turbine engine, the emissions control system and method may be retrofitted into exhaust gas turbine systems by using pre-existing fluid pathways. The use of the fluid pathways also may improve the distribution and mixing of the reducing agent in the exhaust gas and may increase the residence time of the reducing agent in the exhaust gas upstream from one or more additional emissions control systems, such as a selective catalytic reduction (SCR) system disposed in an exhaust duct downstream from the turbine.

FIG. 1 is a block diagram of an embodiment of a gas turbine system 10 having an emissions control system 11 configured to reduce the level of exhaust emissions and the visibility of the exhaust emissions (e.g., nitrogen oxides ($NO_x$), sulfur oxides ($SO_x$), particulate matter, and other pollutants). In the illustrated embodiment, the gas turbine system 10 includes a turbine engine 12 coupled to a load 14, e.g., an electrical generator. In one embodiment, the turbine engine 12 may be a 7FA gas turbine engine manufactured by General Electric Company, Greenville, S.C. The turbine engine 12 includes an air intake 16, a compressor 18, one or more fuel nozzles 20, a combustor 22, a turbine 24, and an exhaust duct 26. The exhaust duct 26 may include a horizontal duct portion 25 and a vertical stack portion 27. However, the duct 26 may extend in any direction to an exhaust outlet.

As appreciated, the compressor 18 may include any number of stages, e.g., 1 to 20 stages, of compressor blades rotatable in shrouds. Likewise, the turbine 24 may include any number of stages, e.g., 1 to 20 stages, of turbine blades rotatable in shrouds. The turbine engine 12 can also include multiple compressor 18—turbine 24 couples as found, e.g., in a two shaft aeroderivative turbine engine 12. The combustor 18 also may include a single combustor (e.g., an annular combustor) or multiple combustors (e.g., 2 to 12 combustor cans arranged circumferentially about a rotational axis of the turbine engine 12) arranged in any manner including different designs not mentioned here.

In operation, the turbine engine 12 routes air 28 through the air intake 16 and the compressor 18, which generates compressed air 30 for combustion and cooling flows. In the illustrated embodiment, the fuel nozzles 20 within the combustor 22 receive at least a portion of the compressed air 30 and a fuel 32, which are then directed into a combustion zone of the combustor 22 as indicated by arrows 34. A portion of the compressed air 30 also may flow along the combustor 22 and/or the turbine 24 for cooling purposes. Inside the combustor 22 (e.g., inside the combustion liner), the air 30 and the fuel 32 mix and combust to generate hot products of combustion, which then flow into and through the turbine 24 and the exhaust duct 26. These combustion gases drive turbine blades to rotate within the turbine 24, thereby driving a shaft 36 to rotate the compressor 18 and the load 14.

The emissions control system 11 includes an emissions control unit 38 coupled to an emissions control fluid supply system 40 and a monitoring system 42. The emissions control unit 38 includes a controller 44 having a processor 46, a memory 48, and instructions 49 stored on the memory 48 and executable by the processor 46 to control the emissions control fluid supply system 40 based on feedback from the monitoring system 42. The emissions control fluid supply system 40 includes one or more emissions control fluid supplies 50, one or more flow control units 52, and one or more fluid supply conduits 54. The emissions control fluid supplies 50 may include one or more tanks or storage containers configured to hold and supply emissions control fluids, such as reducing agents. For example, the emissions control fluid supplies 50 (e.g., reducing agent supplies) may include tanks or storage containers of reducing agents, such as ammonia, ethanol, alcohol, and/or hydrogen. The flow control units 52 may include one or more valves, pressure regulators, flowmeters or flow regulators, or any combination thereof. The flow control units 52 may include electric actuators controlled by the emissions control unit 38. In the following discussion, the flow control units 52 may be referred to as valves; however, any reference to valves may include other types of flow control units as noted above.

The fluid supply conduits 54 may be coupled to one or more fluid pathways 56 of the gas turbine system 10, such that the emissions control system 11 can supply one or more of the emissions control fluids (e.g., reducing agents) into the fluid pathways to reduce the level of exhaust emission and the visibility of the exhaust emissions. Additionally, the monitoring system 42 may include one or more sensors 58, indicated by S, configured to obtain sensor feedback of one or more parameters of the gas turbine system 10, such that the emissions control system 11 can adjust (e.g., increase or decrease) the supply of the emissions control fluids (e.g., reducing agents) based on the sensor feedback. The sensors 58 may be distributed throughout the gas turbine system 10 at various locations, such as the compressor 18, the combustor 22, the turbine 24, and the exhaust duct 26.

The sensor feedback of one or more operating parameters may include, or be indicative of, a level of the exhaust emissions and/or a visibility of the exhaust emissions. For example, the sensors 58 may include exhaust emissions sensors (e.g., $NO_x$ sensors, $SO_x$ sensors, particulate matter sensors, and other pollutant sensors) configured to sense emissions levels in the exhaust gas. By further example, the sensors 58 may include visibility sensors, such as opacity sensors, color sensors, or a combination thereof. The visibility sensors 58 may be configured to sense an intensity or level of opacity and/or color of the exhaust emissions in the exhaust gas. Additionally, the sensors 58 may include pressure sensors, temperature sensors (e.g., combustion temperature sensors), flow rate sensors (e.g., fuel flow rate sensors), vibration sensors, and/or fuel composition sensors.

In response to the sensor feedback from the sensors 58, the emissions control system 11 may be configured to (A) selectively supply one or more different emissions control fluids (e.g., reducing agents) by opening and/or closing the flow control units 52 associated with the different emissions control fluid supplies 50, (B) adjust (e.g., increase or decrease) the flow of the selected emissions control fluids to the one or more fluid pathways 56 of the gas turbine system 10, and (C) selectively change the target destination of the selected emissions control fluids in the one or more fluid pathways 56 as discussed further below. For example, the emissions control unit 38 may compare the sensor feedback against one or more thresholds (e.g., upper and/or lower thresholds), determine if the sensor feedback indicates compliance with the one or more thresholds (e.g., falls within acceptable levels or fails to meet the acceptable levels), and then adjust the emissions control fluid supply system 40 based on the indicated compliance or lack of compliance.

For example, the one or more thresholds may include one or more visibility thresholds (e.g., opacity thresholds and/or color thresholds), such as a minimum or lower visibility threshold and an upper or maximum visibility threshold. If the sensed visibility (e.g., opacity or color) does not meet the minimum or lower visibility threshold, then the emissions control unit 38 may selectively increase a flow of the emissions control fluids to the one or more fluid pathways 56 to help reduce the level of emissions and reduce the visibility of the emissions in the exhaust gas. If the sensed visibility (e.g., opacity or color) meets the minimum or lower visibility threshold and exceeds the maximum or upper visibility threshold, then the emissions control unit 38 may selectively hold or reduce a flow of the emissions control fluids to the one or more fluid pathways 56 to avoid wasting the emissions control fluid while maintaining an acceptable level of emissions and an acceptable visibility of the emissions in the exhaust gas. In certain embodiments, the one or more visibility thresholds (e.g., opacity thresholds and/or color thresholds) may correspond to a yellow plume in the exhaust gas, and thus the thresholds may correspond to an opacity and/or intensity of yellow in the yellow plume. However, the disclosed emissions control system 11 may be used for any exhaust emissions and associated colors in the exhaust gas.

The fluid pathways 56 may include external conduits outside the gas turbine engine 12, internal passages or conduits extending through the gas turbine engine 12, or a combination thereof. For example, the fluid pathways 56 may include one or more compressor bleed conduits 60 coupled to one or more compressor stages of the compressor 18. In the illustrated embodiment, the compressor bleed conduits 60 are coupled to the compressor 18 driven by the gas turbine engine 12. In some embodiments, the compressor bleed conduits 60 may be coupled to a standalone compressor (e.g., not driven by the gas turbine engine 12). The emissions control system 11 may selectively open or close valves along the compressor bleed conduits 60 to change the temperature and pressure of the compressor bleed air being extracted from the compressor 18 depending on the location (e.g., compressor stage) of extraction.

As an alternative or in addition to the compressor bleed conduits 60, the fluid pathways 56 may include one or more coolant supplies 59, such as an air supply, an inert gas supply (e.g., a nitrogen gas supply), a recirculated exhaust gas supply, or a combination thereof. For example, the coolant supplies 59 may include one or more storage tanks, compressors, pumps, or a combination thereof. In some embodiments, the coolant supplies 59 may include a standalone air compressor, such as an air compressor skid, which may supplement or replace the compressor bleed air from the compressor 18. The one or more compressor bleed conduits 60 and/or the one or more coolant supplies 59 are coupled to one or more distribution conduits 61, which are configured to fluidly couple to one or more target locations throughout the gas turbine system 10.

In certain embodiments, the distribution conduits 61 include one or more coolers 63 (e.g., heat exchangers) configured to cool the flows from the compressor bleed conduits 60 and/or the coolant supplies 59. For example, in certain embodiments, at least one of the coolant supplies 59 is configured to flow a coolant through the cooler 63 to transfer heat away from the compressor bleed air from the compressor bleed conduits 60 and/or a different coolant from a different one of the coolant supplies 59. In some embodiments, at least one of the coolant supplies 59 is configured to direct a coolant into the compressor bleed conduit 60 with or without the compressor bleed air from the compressor bleed conduits 60. Accordingly, the compressor bleed air from the compressor bleed conduits 60 and/or the coolant from one or more of the coolant supplies 59 may be described as coolant supplies for other components of the gas turbine system 10.

The foregoing coolant supplies (e.g., 59, 60) are fluidly coupled to one or more target locations in the gas turbine system 10 via the distribution conduits 61, such as one or more coolant conduits 62, 66, 74, and 80 as described below. For example, the fluid pathways 56 may include one or more coolant conduits 62 fluidly coupled to bearing cavities or housings having bearings 64 for the shaft 26. These bearing cavities or bearings 64 may be part of an internal cooling circuit of the gas turbine engine 12.

The fluid pathways 56 may include one or more coolant conduits 66 fluidly coupled to the combustor 22. For example, the coolant conduits 66 may be fluidly coupled to an internal compressed air flow path between a combustor liner 68 and a flow sleeve 70 of the combustor 22, an internal cavity in a head end 72 of the combustor 22, an internal cavity of the fuel nozzles 20, or a combination thereof. The foregoing flow paths or cavities of the combustor 22 may be part of an internal cooling circuit of the gas turbine engine 12.

The fluid pathways 56 also may include one or more coolant conduits 74 fluidly coupled to one or more turbine stages of the turbine 24. For example, the coolant conduits 74 may fluidly couple to an internal cooling flow path between an outer casing 76 and an inner shroud 78 of the turbine 24, and one or more internal cooling flow paths through turbine stator vanes, turbine rotor blades, turbine wheels, and/or bearing cavities. Again, the foregoing flow paths of the turbine 24 may be part of an internal cooling circuit of the gas turbine engine 12.

The fluid pathways 56 also may include one or more conduits 80 (e.g., bypass conduits) fluidly coupled to the exhaust duct 26 downstream from the turbine 24. The conduits 80 may be coupled to the exhaust duct 26 upstream, downstream, or at locations of one or more emissions control units 82 inside the exhaust duct 26. The exhaust duct 26 may include any number and arrangement (e.g., parallel or series arrangements) of emissions control units 82, such as emissions control units 84, 86, 88, 90, and 91. In certain embodiments, the emissions control system 11 may include a fluid manifold 92 configured to distribute the coolant from the conduits 61, 80 into the exhaust duct 26. The fluid manifold 92 also may be configured to inject other fluids into the exhaust duct 26, such as emissions control fluids (e.g., reducing agents) supplied by the emissions control fluid supply system 40.

The emissions control units 82 (e.g., 84, 86, 88, 90, and 91) may include one or more of: heat exchangers, evaporators, emissions control fluid injection grids, catalysts (e.g., selective catalytic reduction (SCR) systems), or any combination thereof. For example, in certain embodiments, the emissions control units 84, 86, 88, 90, and 91 may include a first injection grid, a heat exchanger (e.g., a high pressure superheater), a second injection grid, an evaporator (e.g., a high pressure evaporator), and a SCR system, respectively. The first and second injection grids (e.g., 84, 88) may be configured to inject the same or different emissions control fluids. For example, the first injection grid (e.g., 84) may be configured to inject a first emissions control fluid comprising ethanol, and the second injection grid (e.g., 88) may be configured to inject a second emissions control fluid comprising ammonia. The emissions control fluids may be injected into the exhaust gas in liquid form (e.g., as a spray) via the injection grids, in vapor form (e.g., vaporized with additional heat) via an evaporator, or any combination thereof. For example, the second injection grid 88 may be configured to inject ammonia (e.g., ammonia solution or anhydrous ammonia) or in some cases urea that can be hydrolyzed/decomposed in the end making vaporized ammonia.

In the illustrated embodiment, the emissions control system 11 is configured to supply the emissions control fluid directly into the exhaust gas via the fluid conduit 54 coupled to the exhaust duct 26 and/or indirectly into the exhaust gas via the one or more fluid pathways 56 (e.g., coolant circuits in the gas turbine engine 12) as discussed above. Accordingly, based on an analysis of the sensor feedback from sensors 58 as discussed above, the emissions control unit 38 may selectively adjust one or more flow control units 52 (e.g., valves) to vary a flow of the emissions control fluid (e.g., reducing agent) from the one or more emissions control fluid supplies 50 into the one or more fluid pathways 56 eventually leading into the exhaust gas and also directly into the exhaust duct 26 via the fluid supply conduit 54. At the exhaust duct 26, the supplied emissions control fluid may be injected via one or more of the emissions control units 82 (e.g., 84, 86, 88, 90, and 91), such as via an injection grid and/or an evaporator as discussed above. The injection grid(s) may include a plurality of conduits (e.g., parallel conduits) having injection openings or nozzles distributed across an exhaust flow path of the exhaust duct 26. A heat exchanger may be used to add heat to the exhaust flow path, thereby helping to evaporate the injected emissions control fluid. An evaporator may be used to evaporate the emissions control fluid prior to injection into the exhaust flow path. The supply of the emissions control fluid into the one or more fluid pathways 56 of the gas turbine engine 12 may improve the mixing and residence time of the emissions control fluid with the exhaust gas, thereby helping to reduce emissions and visibility of the emissions before being discharged from the exhaust duct 26 into the atmosphere.

Figure 2:
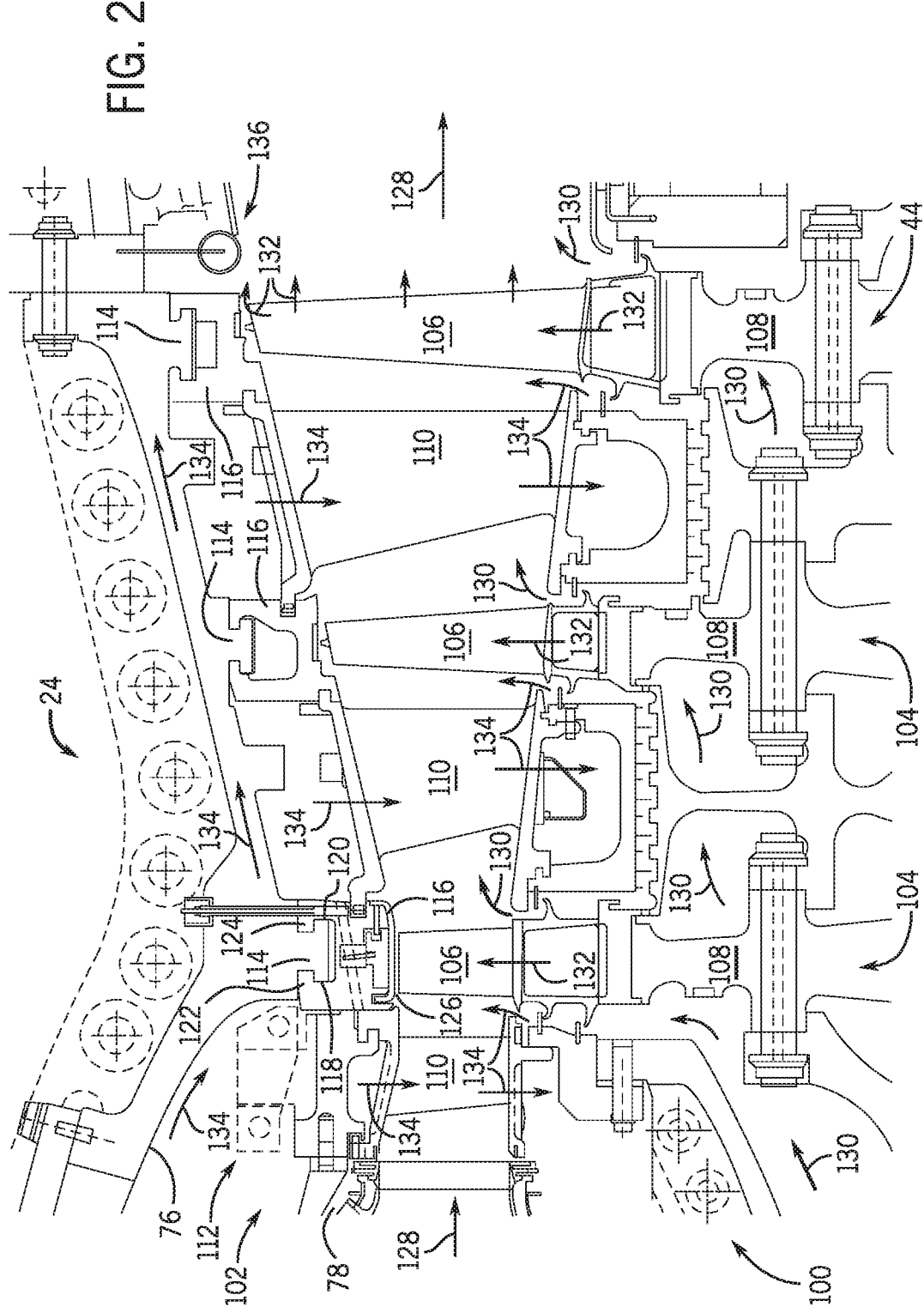
FIG. 2 is a partial cross-sectional view of an embodiment of the turbine of FIG. 1, illustrating cooling flows along fluid pathways inside the turbine.

FIG. 2 is a partial cross-sectional view of an embodiment of the turbine 24 of FIG. 1, illustrating cooling flows along the fluid pathways 56 inside the turbine 24. In the illustrated embodiment, the turbine 24 includes a rotor 100 circumferentially surrounded by a stator 102, wherein the turbine 24 includes a plurality of axially spaced turbine stages 104. In each stage 104, the rotor 100 includes a plurality of turbine blades 106 mounted in a circumferential arrangement about a wheel 108, and the stator 102 includes a plurality of stator vanes 110 mounted in a similar circumferential arrangement about a casing 112. The illustrated casing 112 includes the outer casing 76 and an inner shroud 78, wherein the outer casing 112 has a plurality of hangers 114 supporting shroud segments 116. In particular, each hanger 114 includes a pair of hooks 118 and 120, which mate with complementary hooks 122 and 124 of the respective shroud segment 116. These shroud segments 116 generally align with the turbine blades 106 in each stage 104 and define a clearance 126. In operation, the hot combustion gases flow through each stage 104, thereby driving rotation of the turbine blades 106 within the respective shroud segments 116.

In the illustrated embodiment, various components of the turbine 24 (e.g., the rotor 100, the stator 102, the blades 106, the wheels 108, the stator vanes 110, and the casing 112) include one or more of the fluid pathways 56 discussed above with reference to FIG. 1. For example, the fluid pathways 56 may extend through the rotor 100, around and/or into the wheels 108, and into an exhaust flow path 128 as indicated by arrows 130. The fluid pathways 56 also may extend from the rotor 100, into and through the blades 106, and into the exhaust flow path 128 as indicated by arrows 132. As illustrated by arrows 134, the fluid pathways 56 may extend into and through the stator 102 between the outer casing 76 and the inner shroud 78 of the casing 112, through and/or around the shroud segments 116 and into the exhaust flow path 128, through the stator vanes 110 and into the exhaust flow path 128, and/or through the stator vanes 110 to the rotor 100 and then into the exhaust flow path 128.

The illustrated fluid pathways 56 (e.g., as represented by arrows 130, 132, and 134) are used by the emissions control system 11 to supply one or more emissions control fluids (e.g., reducing agents) into the exhaust flow path 128 upstream of an exhaust outlet 136 of the turbine 24. As noted above, the illustrated fluid pathways 56 may be part of a cooling circuit (e.g., a turbine cooling circuit) of the gas turbine engine 12. Thus, the emissions control system 11 advantageously supplies the one or more emissions control fluids (e.g., reducing agents) into the cooling circuit, such that the emissions control system 11 can be retrofitted into any new or pre-existing gas turbine engine 12 (e.g., already installed on site) to improve the emissions control of the gas turbine system 10.

Figure 3:
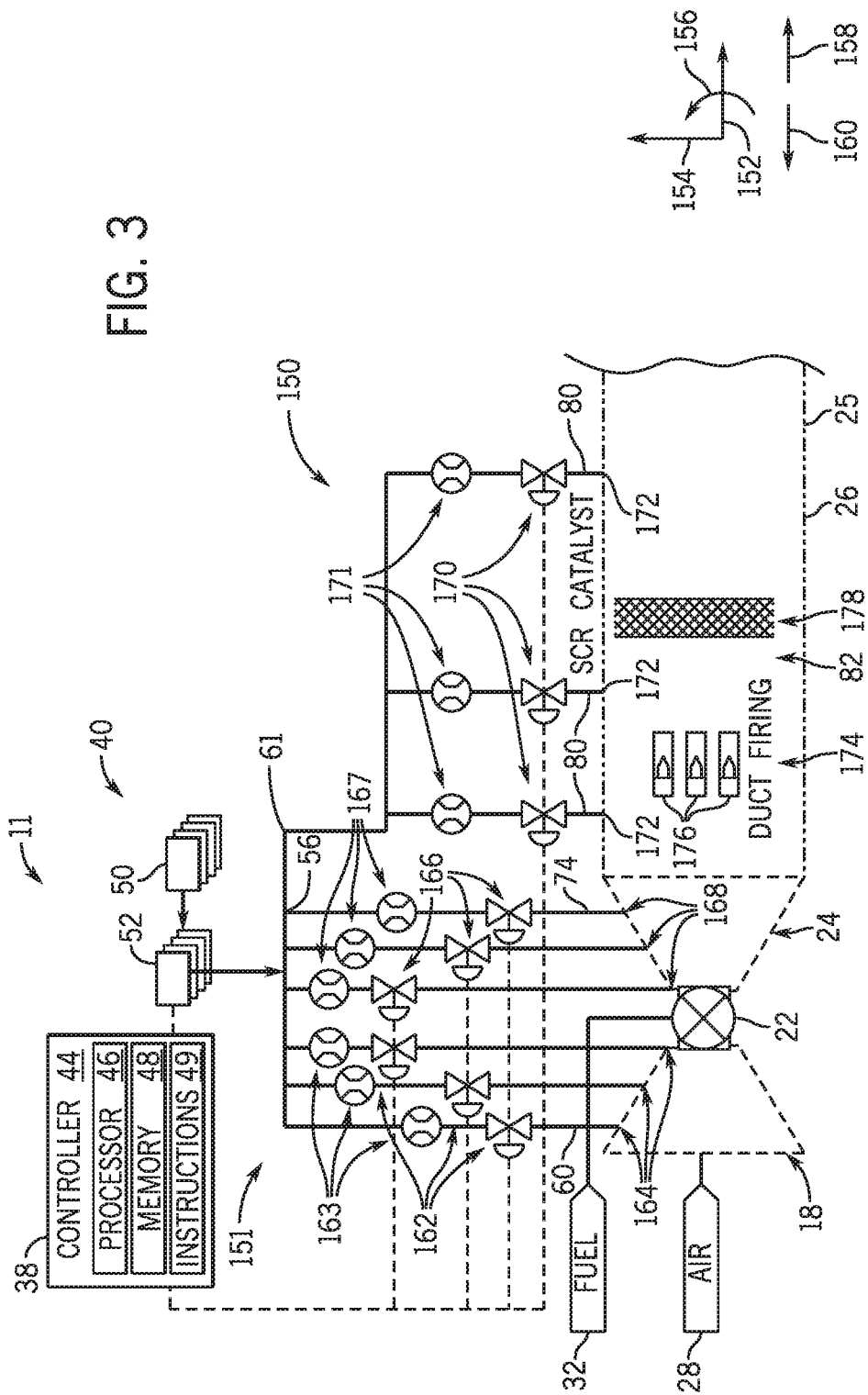
FIG. 3 is a diagram of an embodiment of the gas turbine system of FIG. 1, illustrating an embodiment of the emissions control system having a valve control system and a flow meter system.

FIG. 3 is a diagram of an embodiment of the gas turbine system 10, illustrating an embodiment of the emissions control system 11 having a valve control system 150 and a flow meter system 151 configured to control and monitor flows along the fluid pathways 56. In the following discussion, reference may be made to an axial direction or axis 152 (e.g., along a longitudinal axis) of the gas turbine engine 12, a radial direction or axis 154 extending radially away from the longitudinal axis of the gas turbine engine 12, and a circumferential direction or axis 156 extending circumferentially about the longitudinal axis of the gas turbine engine 12. Reference may also be made to a downstream direction 158 and an upstream direction 160 relative the flow direction through the gas turbine engine 12.

In the illustrated embodiment, each of the compressor bleed conduits 60 coupled to the compressor 18 includes a valve 162 and a flowmeter 163 communicatively coupled to the emissions control unit 38. For example, the compressor bleed conduits 60 may be coupled to extraction points 164 at different stages of the compressor 18, such that different temperatures and pressures of compressor bleed air can be extracted from the compressor 18 into the compressor bleed conduits 60.

Similarly, each of the coolant conduits 74 coupled to the turbine 24 includes a valve 166 and a flowmeter 167 communicatively coupled to the emissions control unit 38. For example, the coolant conduits 74 may be coupled to injection points 168 at different stages of the turbine 24, such that the same or different coolant flows can be injected into the turbine 24 depending on the temperature in various locations in the turbine 24.

Similarly, each of the coolant conduits 80 coupled to the exhaust duct 26 includes a valve 170 and a flowmeter 171 communicatively coupled to the emissions control unit 38. For example, the coolant conduits 80 may be coupled to injection points 172 at different positions (e.g., different axial positions relative to the downstream direction 158), such that the same or different coolant flows can be injected into the exhaust duct 24 at various positions relative to the emissions control units 82 (e.g., upstream, downstream, or directly at the units 82). The illustrated emissions control units 82 include a duct burner assembly 174 having a plurality of duct burners 176 positioned upstream from a SCR system 178. The illustrated injection points 172 are disposed at a first position upstream from both the duct burner assembly 174 and the SCR system 178, at a second position between the duct burner assembly 174 and the SCR system 178, and at a third position downstream from both the duct burner assembly 174 and the SCR system 178.

In operation, as discussed above, the emissions control unit 38 is configured to monitor flowrates of the coolant flows via the flowmeters 163, 167, and 171 of the flow meter system 151 and to selectively adjust the valves 162, 166, and 170 of the valve control system 150 to control the coolant flows from the compressor 18 into the turbine 24 and the exhaust duct 26. Additionally, the emissions control unit 38 is configured to selectively control the flow control units 52 to supply one or more emissions control fluids into the one or more fluid pathways 56. In certain embodiments, the emissions control system 11 is configured to supply the one or more emissions control fluids into a common distribution conduit 61 coupled to the coolant conduits 74 and/or the coolant conduits 80. However, in some embodiments, the emissions control system 11 is configured to supply the one or more emissions control fluids into a separate distribution conduit 61 coupled to each of the coolant conduits 74 and/or a separate distribution conduit 61 coupled to each of the coolant conduits 80.

Each valve 162, 166, and 170 may be a ball valve, a globe valve, a butterfly valve, a diaphragm valve, or any other valve type that allows for rotary or sliding action to control the flow of a fluid. In some embodiments, the valves 162, 166, and/or 170 may be multi-way valves (e.g., 3-way valves) or include injection ports to supply the emissions control fluid into the one or more fluid pathways 56. The flowmeters 163, 167, and 171 may include mechanical flowmeters (e.g., gear flowmeters, turbine flowmeters, and/or jet flowmeters), pressure-based flowmeters (e.g., venturi meters), variable area flowmeters, optical flowmeters, magnetic flowmeters, ultrasonic flowmeters, or any combination thereof.

The valve control system 150 may be operated by the controller 44 based at least in part on flowrate information sensed by the flow meter system 151. For example, flow information acquired from the flowmeters 163, 167, and 171 may be analyzed by the controller 44 to determine operation of the valves 162, 166, and 170. In one or more embodiments, the controller 44 may automatically control the position of the valves 162, 166, and 170 to adjust the flow path (i.e., open a valve to allow flow, close a valve to stop flow). In one or more embodiments, the controller 44 determines flow of an emissions control fluid (e.g., reducing agent) through the gas turbine system 10. The controller 44 may be located with the gas turbine system 10 or separate in a remote location receiving information through a network (e.g., located in an operating room receiving data via a LAN network).

Figure 4:
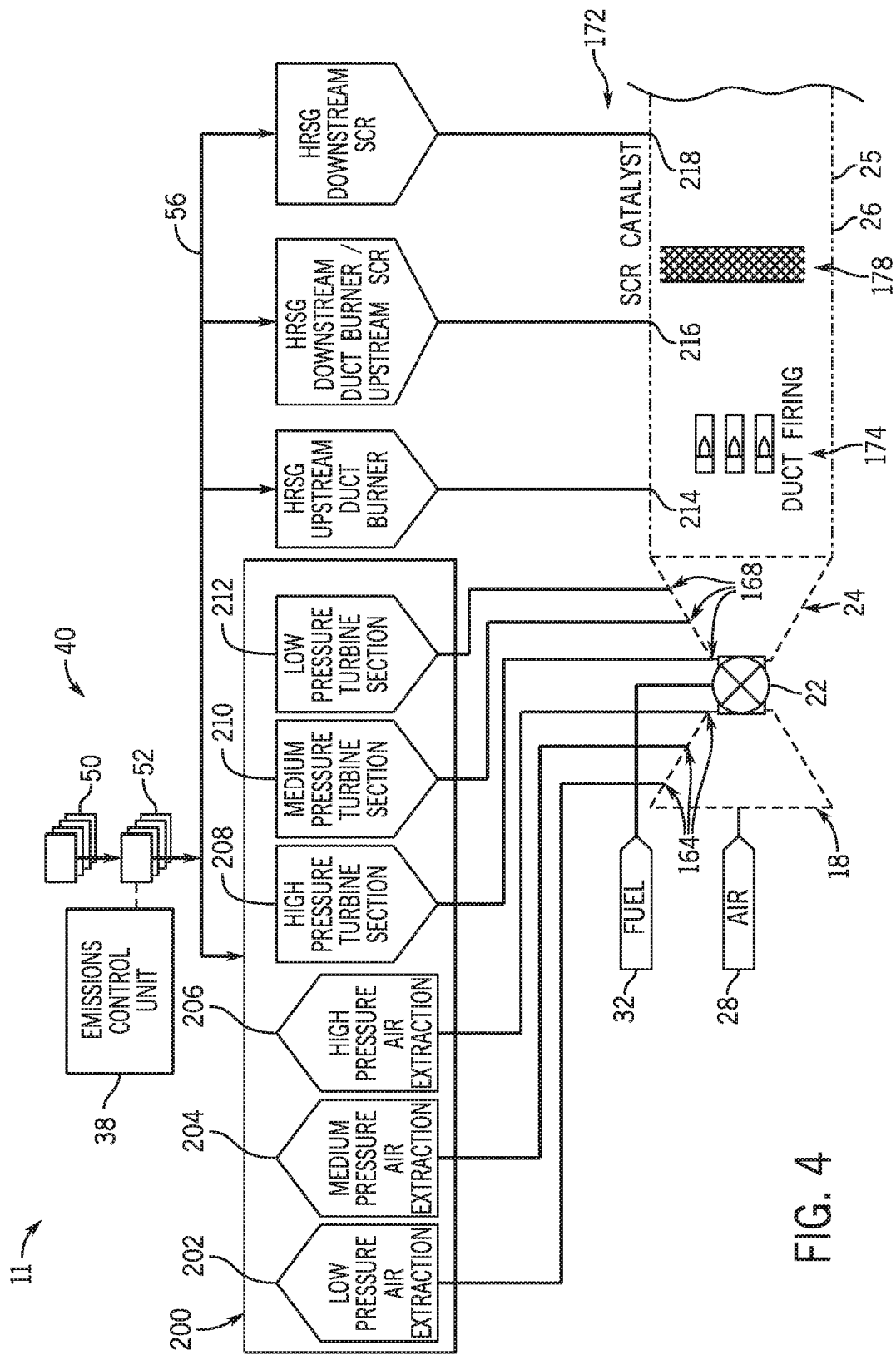
FIG. 4 is a diagram of an embodiment of the gas turbine system of FIG. 1, illustrating an embodiment of the emissions control system having various extraction points in the compressor and injection points in the turbine and the exhaust duct.

FIG. 4 shows a detailed view of the extraction points 164, the injection points 168 into the turbine 24, the injection points 172 into the exhaust duct 26, and a cooling circuit 200 associated with the gas turbine engine 12. The extraction points 164 may include low pressure, medium pressure, and high pressure extraction points, which are configured to obtain a low pressure air extraction 202, a medium pressure air extraction 204, and a high pressure air extraction 206 for use in the cooling circuit 200. The injection points 168 may include high pressure, medium pressure, and low pressure injection points, which are configured to inject the extracted compressor air into a high pressure turbine section 208, a medium pressure turbine section 210, and a low pressure turbine section 212 of the turbine 24 for use in the cooling circuit 200. In one or more embodiments, the extraction points 164 and the injection points 168 may not be limited to the pressure rating of the fluid (i.e., low, medium, and high) and may, for example, be determined by the flow rate of the fluid. Additionally, the pressure ratings may be distinguished and not limited to low, medium, and high. For example, the labeling may use the specific pressure of the extraction point, the stage of the extraction point, or a combination thereof.

As discussed above, the emissions control system 11 is configured to supply one or more emissions control fluids (e.g., reducing agents) into fluid pathways 56 of the cooling circuit 200, thereby combining the emissions control fluids with the extracted air being supplied into the injection points 168 into the turbine 24. The cooling circuit 200 may include a connected series of pipes or tubes that interconnect with the injection points 168 and extraction points 164 via valves, fittings, open connections, or any other type of connection. A combination of air and emissions control fluid passes through the fluid pathways 56 inside the turbine 24 (e.g., through casings, blades, vanes, wheels, etc.) and eventually flows into the exhaust gas flowing through and driving the turbine 24.

Additionally, the emissions control system 11 is configured to supply one or more emissions control fluids (e.g., reducing agents) into fluid pathways 56 leading directly to the exhaust duct 26, such as the injection points 172. In the illustrated embodiment, the injection points 172 include a first injection point 214 upstream of the duct burner assembly 174, a second injection point 216 between the duct burner assembly 174 and the SCR system 178, and a third injection point 218 downstream of the SCR system 178. Again, the emissions control system 11 is configured control the flows of emissions control fluids to these injection points 168 and 172 to reduce the level of exhaust emissions and the visibility of the exhaust emissions (e.g., nitrogen oxides ($NO_x$), sulfur oxides ($SO_x$), particulate matter, and other pollutants).

Figure 5:
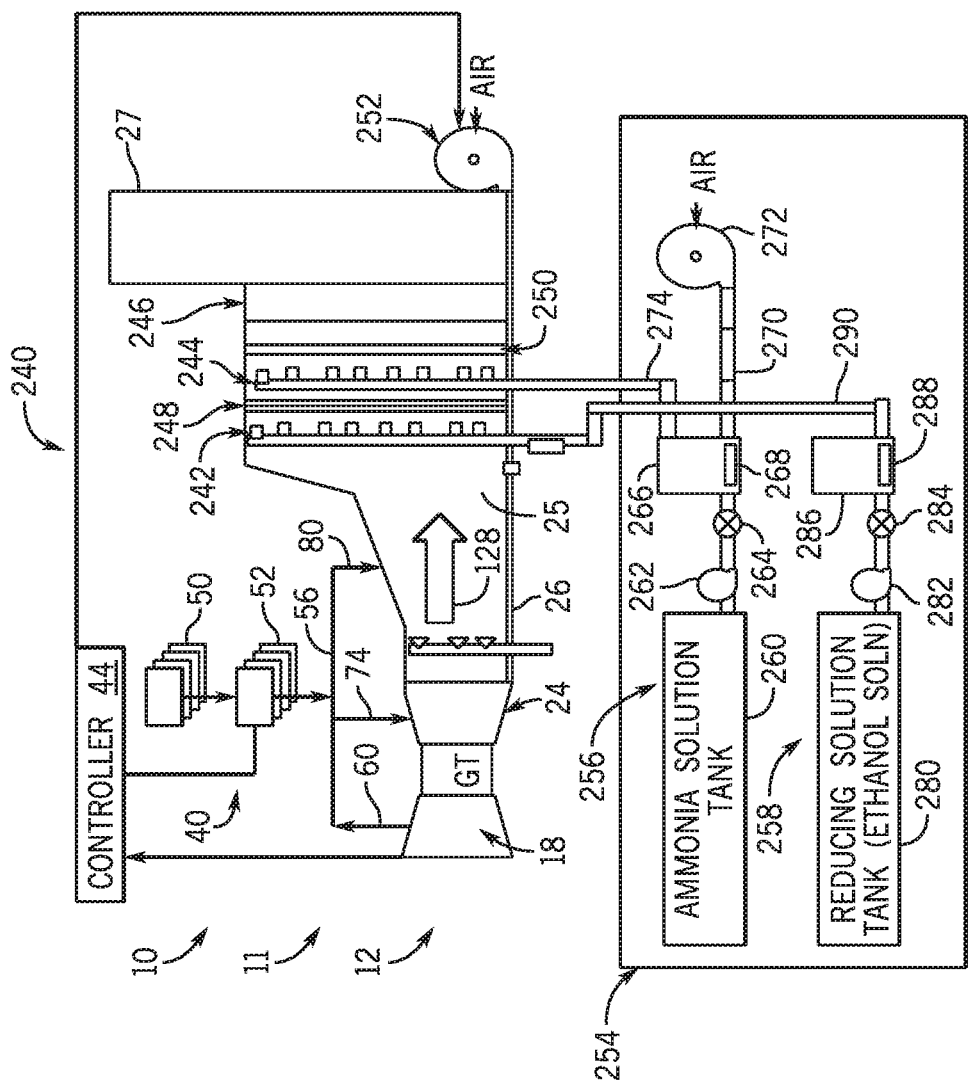
FIG. 5 is a diagram of an embodiment of the gas turbine system of FIG. 1, illustrating an embodiment of the emissions control system having an ammonia solution train and a reducing solution train.

FIG. 5 shows an expanded view of the gas turbine system 10 with an injection system 240 coupled to the exhaust duct 26. In one or more embodiments, the injection system may provide an ammonia solution or anhydrous ammonia, or, in some cases, urea that may be hydrolyzed or decomposed to produce vaporized ammonia. As discussed above with reference to FIG. 1, the exhaust duct 24 may include one or more emissions control units 82. In the illustrated embodiments, the injection system 240 is part of the emissions control units 82. For example, the emissions control units 82 of the injection system 240 may include injection grids 242 and 244, and the emissions control units 82 may also include a SCR system 246, a heat exchanger 248 (e.g., a high pressure superheater), and an evaporator 250 (e.g., a high pressure evaporator) in the exhaust duct 24. In one or more embodiments, the injection grids 242 and 244 may be yellow plume elimination systems (YPES). The injection grids 242 and 244 may utilize various emissions control fluids (e.g., reducing agents such as ethanol, ammonia, and/or alcohol) to cool and reduce exhaust emissions in the exhaust gas 128 passing through the injection grids 242 and 244.

In one or more embodiments, the amount of emissions control fluid injected is controlled by a remote operator and/or the controller 44 based on sensor feedback and various thresholds as discussed in detail above. For example, the controller 44 may adjust (e.g., increase or decrease) the flow of the emissions control fluids if the temperature of the exhaust gas 128 is above or below one or more temperature thresholds, if the visibility of exhaust emissions is above or below one or more visibility thresholds, and/or if the level of exhaust emissions is above or below one or more emissions thresholds. The injection grids 242 and 244 may operate during start up, steady state, and shut down of the gas turbine system 10 to decrease the exhaust emissions (e.g., $NO_x$, $SO_x$, or other pollutants) and the visibility of the exhaust emissions in the exhaust gas 128.

In addition to the injection grids 242 and 244, the gas turbine system 10 may utilize the SCR system 246 to decrease levels of the exhaust emissions. The SCR system 246 may be used in conjunction with the injection grids 242 and 244 or as a stand-alone system. As pollutants, such as $NO_x$, flow through the SCR system 246, the catalyst converts the $NO_x$ into nitrogen and water through reaction with vaporized ammonia as a reduction agent. The catalyst of the SCR system 246 may be made from various ceramic materials such as titanium oxide, vanadium, molybdenum, tungsten, zeolites, or various precious metals. Each material may have advantages and disadvantages, such as operating temperature range, thermal durability, and catalyzing potential.

The SCR system 246 may receive an injection of a reducing agent to reduce pollutants. The amount of reducing agent (e.g., vaporized ammonia) may be controlled by the controller 44.

The SCR system 246 may use a high temperature (>400° F.) to achieve a high conversion rate of $NO_x$ to nitrogen and water. The heat exchanger 248 is configured to add heat into the exhaust gas 128 upstream of the SCR system 246, thereby helping to improve the conversion rate of the $NO_x$. In certain embodiments, a heated fluid (e.g., steam) may circulate through the heat exchanger 248 and transfer heat from the heated fluid into the exhaust gas 128. For example, the heat exchanger 248 may include a superheater (e.g., a high pressure superheater or steam drum) of a heat recovery steam generator (HRSG), which recovers heat from the exhaust gas 128 to generate steam for a steam turbine. The heated fluid (e.g., steam) flowing through the heat exchanger 248 may be at a temperature greater than or equal to a target temperature suitable for the SCR system 246, such as a steam temperature greater than 400° F.

The gas turbine system 10 may also include a blower 252 coupled to the exhaust duct 26 downstream of the turbine 24. The blower 252 may be an air blower that assists in dilution by providing blowback air across the compressor 18 and the turbine 24. The blower 252 may be linked to the controller 44 that monitors the gas turbine system 10. The controller 44 may adjust the operational speed of the blower 252 or turn on/off the blower 252 based on the requirements of the gas turbine system 10.

The gas turbine system 10 may also include a reducing solution system 254. The reducing solution system 254 may connect to the gas turbine system 10 via the injection grids 242 and 244. In one or more embodiments, the reducing solution system 254 may connect to the gas turbine system 10 via one or more fluid pathways 56, such as the cooling circuit 200. The connection may be made through pipes, tubes, valves, and other methods of mechanical connection. The connection may allow one or more reducing agents to be injected directly into the injection grids 242 and 244, one or more fluid pathways 56, the cooling circuit 200, or the SCR system 246. In one or more embodiments, the reducing agent may be delivered through the air cooling and/or bleeding lines of the gas turbine 24, e.g., fluid pathways 56. The reducing agent may be ammonia (solution, anhydrous, or derived from urea or other ammonia compounds), ethanol, alcohol, or any other type of chemical configured to reduce exhaust emissions.

In one or more embodiments, the reducing solution system 254 may include an ammonia solution train 256 and a reducing solution train 258. The ammonia solution train 256 may include an ammonia solution tank 260, a pump 262, a valve 264, an evaporator or evaporation tank 266, electric heaters 268 and 270, an air blower 272, and a fluid conduit 274 coupled to the injection grid 244. The pump 262 and valve 264 are controlled by the controller 44 to adjust (e.g., increase or decrease) a flow of an ammonia solution from the ammonia solution tank 260 to the evaporator 266, while the air blower 272 provides an airflow to the evaporator 266. The electric heaters 268 and 270 are configured to heat the airflow and/or the ammonia solution in the evaporator 266, thereby evaporating the ammonia solution to supply an evaporated ammonia solution to the injection grid 244.

The reducing solution train 258 may include a reducing solution tank 280, a pump 282, a valve 284, an evaporator or evaporation tank 286, an electric heater 288, and a fluid conduit 290 coupled to the injection grid 242. The pump 282 and valve 284 are controlled by the controller 44 to adjust (e.g., increase or decrease) a flow of a reducing solution (e.g., ethanol) from the reducing solution tank 280 to the evaporator 286. The electric heater 288 is configured to heat the reducing solution in the evaporator 286, thereby evaporating the reducing solution to supply an evaporated reducing solution to the injection grid 242.

In addition to supplying emissions control fluids to the exhaust duct 26, the reducing solution system 254 may be integrated with or cooperate with the emissions control fluid supply system 40 of the emissions control system 11 to supply the ammonia solution and/or the reducing solution into the one or more fluid pathways 56.

Figure 6:
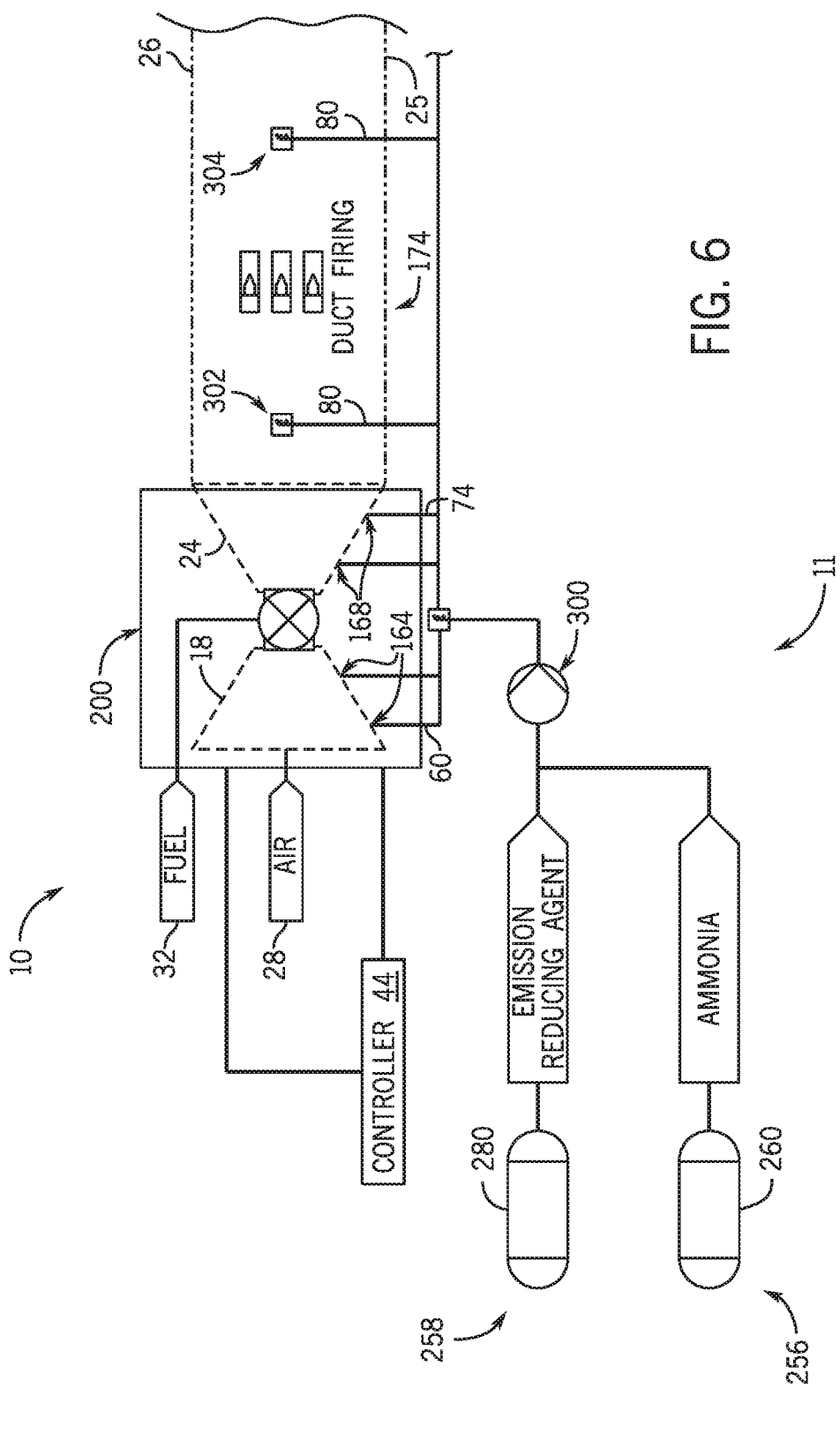
FIG. 6 is a diagram of an embodiment of the gas turbine system of FIG. 1, illustrating an embodiment of the emissions control system having the ammonia solution train and the reducing solution train of FIG. 5 coupled to a common fluid circuit.

FIG. 6 is a diagram illustrating an embodiment of the reducing solution system 254 of the emissions control system 11 interacting with the gas turbine system 10. The reducing solution system 254 includes the ammonia solution train 256 and the reducing solution train 258 having the tanks 260 and 280 connected to a single control valve 300. The control valve 300 may control the amount of flow for each emissions control fluid (e.g., ammonia and emissions reducing agent) through a common fluid conduit to the gas turbine system 10, which may be controlled by the controller 44. The emissions control fluids are injected into the gas turbine system 10 at various portions of the fluid pathways 56, such as at the compressor bleed conduits 60, the distribution conduits 61, the coolant conduits 74 coupled to the turbine 24, and/or the coolant conduits 80 coupled to the exhaust duct 26.

The controller 44 may monitor the exhaust gas 128 and various operating parameters of the gas turbine system 10 to determine the amount of flow of the emissions control fluids suitable to reduce the level of exhaust emissions and the visibility of the exhaust emissions (e.g., yellow plume levels). The controller 44 may route at least part of the emissions control fluids to the one or more fluid pathways 56 (e.g., cooling circuit 200) and also may route at least part of the emissions control fluids to the exhaust gas 128 in the exhaust duct 26 (e.g., via injection grids 302 and 304). In the illustrated embodiment, the injection grid 302 is disposed in the exhaust duct 26 upstream of the duct burner assembly 174 while the injection grid 304 is disposed in the exhaust duct 26 downstream from the duct burner assembly 174.

Figure 7:
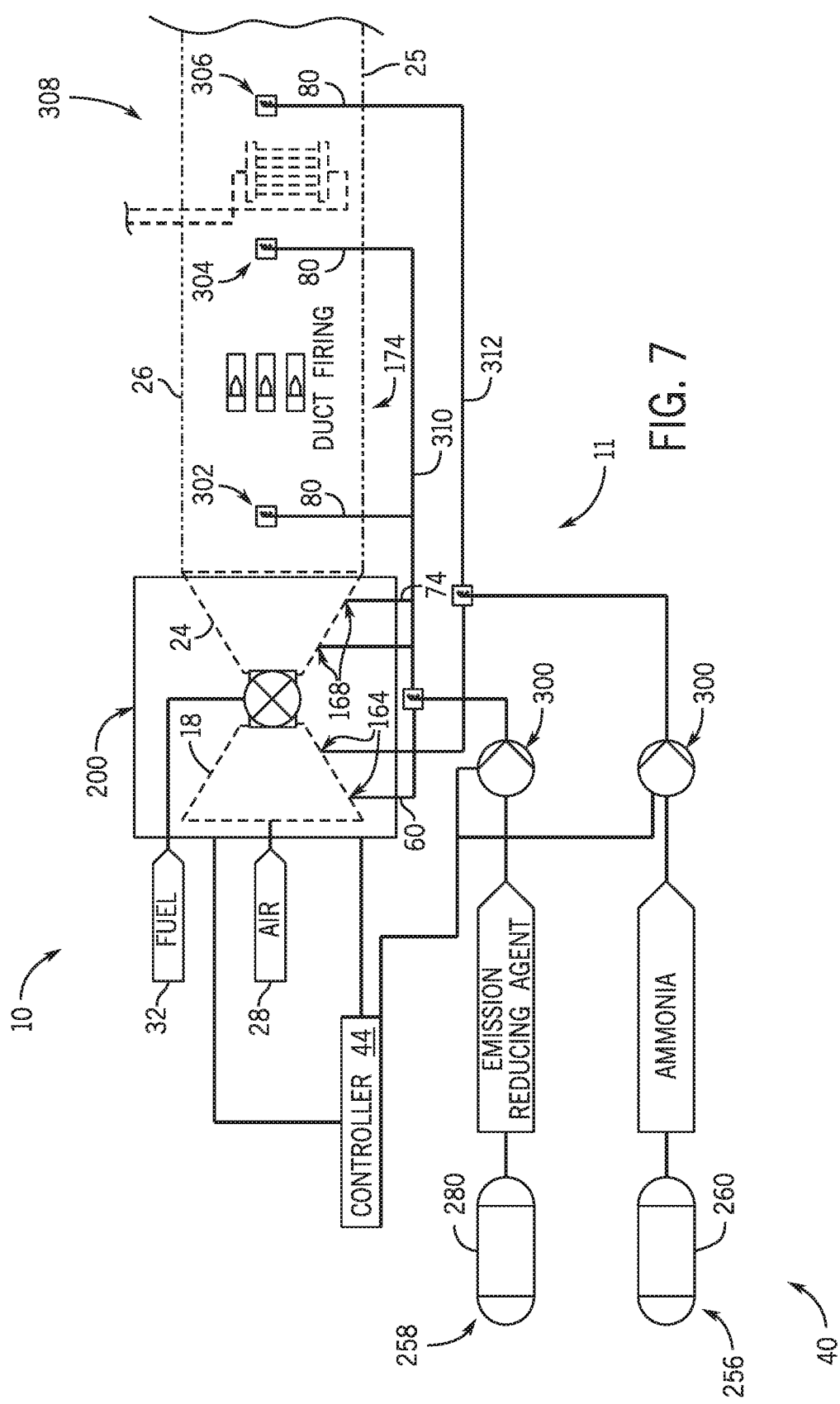
FIG. 7 is a diagram of an embodiment of the gas turbine system of FIG. 1, illustrating an embodiment of the emissions control system having the ammonia solution train and the reducing solution train of FIG. 5 coupled to different fluid circuits.

FIG. 7 is a diagram illustrating an embodiment of the reducing solution system 254 of the emissions control system 11 interacting with the gas turbine system 10. The embodiment of FIG. 7 is substantially the same as the embodiment of FIG. 6, except that a separate control valve 300 is used for each of the tanks 260 and 280, an injection grid 306 is disposed in the exhaust duct 26 downstream from the injection grids 302 and 304, and a heat exchanger 308 (e.g., 248, FIG. 5) is disposed between the injection grids 304 and 306. The controller 44 is communicatively coupled to the control valves 300, such that the controller 44 can independently control the flows of ammonia and emissions reducing agent from the tanks 260 and 280, respectively.

The reducing solution train 258 may be connected to a first one of the control valves 300, which is connected to a first fluid circuit 310 (e.g., coolant circuit) extending from one of the compressor bleed conduits 60 to a plurality of coolant conduits 74 coupled to the turbine 24 and a plurality of coolant conduits 80 coupled to the exhaust duct 26. In particular, the first fluid circuit 310 extends to the coolant conduits 80 coupled to the injection grids 302 and 304. The ammonia solution train 256 may be connected to a second one of the control valves 300, which is connected to a second fluid circuit 312 extending from one of the compressor bleed conduits 60 to one of the coolant conduits 80 coupled to the exhaust duct 26. In particular, the second fluid circuit 312 extends to the coolant conduit 80 coupled to the injection grid 306 (e.g., an ammonia injection grid). The controller 44 may determine the amount of reducing agent and/or ammonia suitable to lower a level of exhaust emissions and a visibility of the exhaust emissions (e.g., yellow plume) and may operate the control valves 300 to route the reducing agent to the first fluid circuit 310 and the ammonia to the second fluid circuit 312. While the example shows specific flow paths for the reducing solution system 254, the control valves 300 may divert flow for each solution train 256 and 258 in any number of ways.

Figure 8:
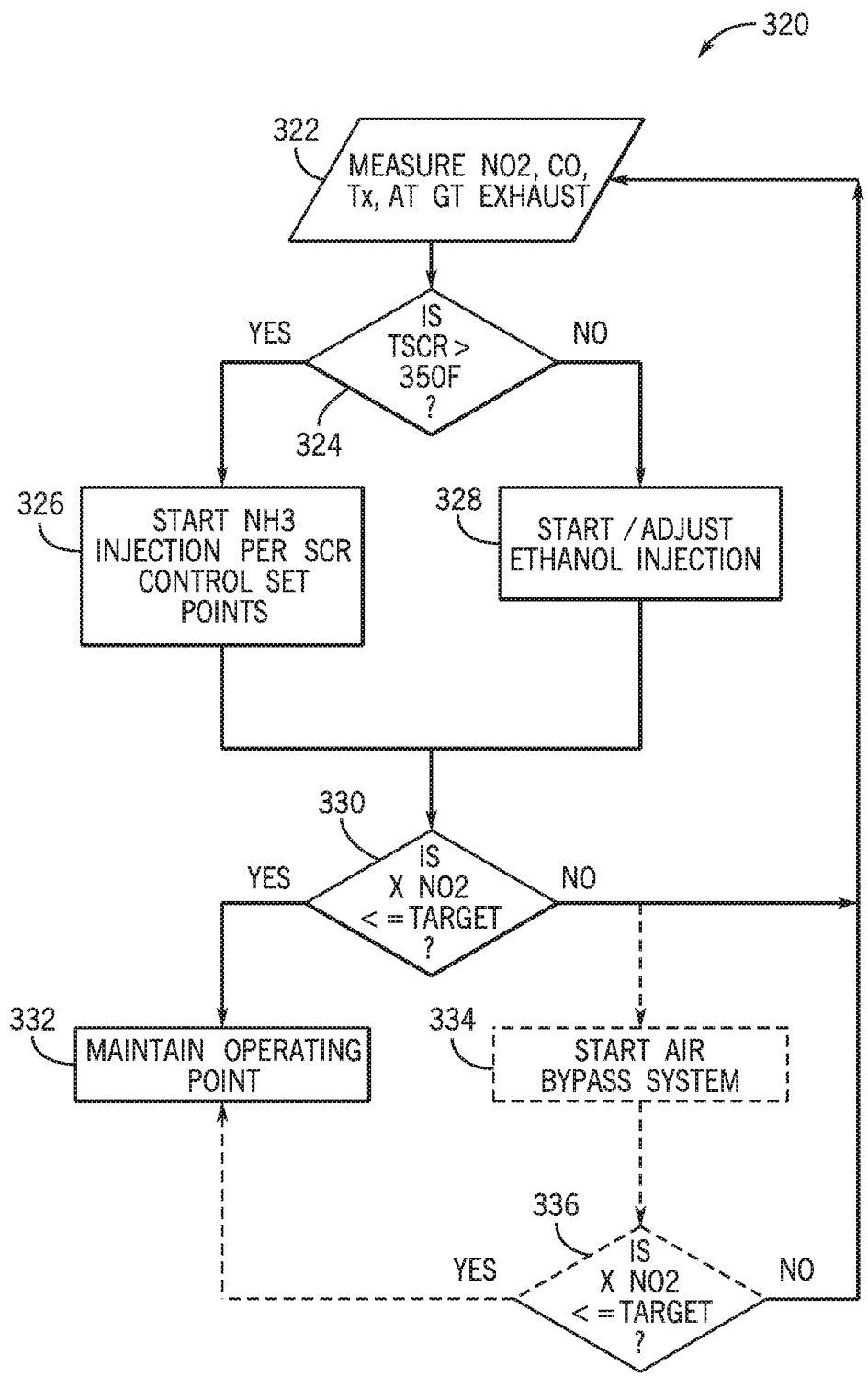
FIG. 8 is a flow chart of an embodiment of a process for reducing exhaust emissions and a visibility of the exhaust emissions in a gas turbine system.

FIG. 8 is a flow chart of an embodiment of a process 320 for reducing exhaust emissions and a visibility of the exhaust emissions in a gas turbine system 10. The process 320 may include the instructions 49 stored on the memory 48 and executable by the processor 46 of the controller 44 as discussed above. In step 322, the process 320 measures one or more parameters of the gas turbine system 10. For example, the process 320 may measure (e.g., using sensors) the parameters in the exhaust duct 26, in the combustor 22, in the turbine 24, or any other suitable location. The process 320 may measure the parameters during start up, during steady state operation, or during shutdown of the gas turbine system 10. The measured parameters may include $NO_x$ levels, $SO_x$ levels, CO levels, temperature of the exhaust, temperature of a catalyst of the SCR system 246, visibility levels (e.g., degree of opacity and/or color), and any other parameter associated with the exhaust emissions.

In step 324, the process 320 evaluates whether a temperature of the SCR system 246 (e.g., TSCR) is greater than 350° F. The TSCR may be the temperature of the exhaust gas 128 at the SCR system 246, a temperature of a catalyst of the SCR system 246, or a combination thereof. The controller 44 may continually monitor the temperature of the SCR system 246 to determine the next steps. If the temperature at the SCR system 246 is greater than 350° F., the process 320 moves to step 326. If the temperature at the SCR system 246 is less than 350° F., the process 320 moves to step 328.

In step 326, the process 320 controls a reducing solution system to begin or adjust an ammonia injection into the SCR system 246 via coolant conduits 80 and/or into one or more fluid pathways 56 (e.g., coolant conduits 62, 66, and/or 74) of the gas turbine engine 12. The ammonia may be injected into the SCR system 246 to allow for the SCR system 246 to reduce $NO_x$ and other emissions using a catalyst in the SCR system for conversion. The efficiency of the conversion is proportional to the temperature of the SCR system 246. Thus, with the SCR system 246 operating above 350° F., the controller 44 selectively routes ammonia to the SCR system 246. The controller 44 may operate a control valve 300 connected to the reducing solution system to control the flow of ammonia into the SCR system 246.

In step 328, the process 320 begins or adjusts an ethanol injection via a reducing solution system. The process 320 may control the ethanol injection into one or more fluid pathways 56 (e.g., coolant conduits 62, 66, 74, and/or 80), such as the cooling circuit 200. The process 320 may selectively supply the ethanol to all or select injection points in the bearings 64, the combustor 22, the turbine 24, the exhaust duct 26, or a combination thereof, thereby helping to reduce emission levels (e.g., $NO_x$ levels) and visibility of the emissions (e.g., yellow plume). The controller 44 may operate a control valve 300 connected to the reducing solution system 258 to control the flow of ethanol into the gas turbine system 10. As noted above, reducing agents other than ethanol may be used.

Although the process 320 illustrates steps 326 and 328 as alternatives following step 324, embodiments of the process 320 may simultaneously use the emissions control measures of both steps 326 and 328 and make adjustments to both ammonia injection and ethanol injection to reduce emissions levels and visibility of the emissions. In step 330, the process 320 evaluates whether the $NO_x$ levels are reduced below a target level (e.g., threshold). The controller 44 actively monitors $NO_x$ levels at the turbine exhaust, the flow of reducing agents (e.g., ammonia and ethanol), and operations at each part of the gas turbine system (e.g., injection points, compressor, turbine, injection grids, cooling circuit). If the $NO_x$ levels are determined to be below a pre-determined target level, the process 320 continues maintaining operation at the operating point as indicated by step 332. However, if $NO_x$ levels still exceed the pre-determined target level, the process 320 may repeat the process or move to optional step 334.

In optional step 334, the controller 44 operates a blower 252 to provide bypass air to the gas turbine system 10. In optional step 336, another determination is made by the controller 44 to determine if $NO_x$ levels are reduced below a target level due to the bypass air. If the controller 44 determines $NO_x$ levels are reduced below a target level, the process 320 continues to maintain operating at the operating point as indicated by step 332. If the controller 44 determines that $NO_x$ levels are not below a target level, the controller 44 may begin the process again.

Technical effects of the disclosed embodiments enable a reduction in exhaust emissions levels and associated visibility of the exhaust emissions by injecting an emissions control fluid (e.g., reducing agent) into one or more fluid pathways 56 of the gas turbine engine 12. The fluid pathways 56 may including cooling pathways through the bearings 64, the combustor 22, and/or the turbine 24 (e.g., one or more cooling circuits). The fluid pathways 56 also may extend to the exhaust duct 26. However, the injection of emissions control fluids into the fluid pathways upstream from the exhaust outlet 136 of the turbine 24 may help improve the mixing and residence time of the emissions control fluids with the exhaust gas, thereby helping to reducing the exhaust emissions and the visibility of the exhaust emissions before being discharged into the atmosphere.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A method, comprising:
   receiving a feedback, via at least one sensor of an emissions control system, of one or more parameters of a gas turbine system having a flow path of an exhaust gas, wherein the one or more parameters are indicative of a visibility of emissions in the exhaust gas from the gas turbine system;
   reducing the visibility of the emissions of the exhaust gas by adjusting a first valve, via a controller of the emissions control system, to adjust a first flow of a first reducing agent from a first tank of a first reducing agent supply through a first conduit to introduce the first reducing agent into the flow path of the exhaust gas at a first position, wherein the first reducing agent comprises ethanol, alcohol, and/or hydrogen; and
   reducing the visibility of the emissions of the exhaust gas by adjusting a second valve, via the controller, to adjust a second flow of a second reducing agent from a second tank of a second reducing agent supply through a second conduit to introduce the second reducing agent into the flow path of the exhaust gas at a second position, wherein the second position is downstream from the first position, wherein the first and second reducing agents are different from one another.

2. The method of claim 1, wherein the feedback comprises visibility feedback, the at least one sensor comprises a visibility sensor, and adjusting the first and second valves is based on the visibility feedback.

3. A system, comprising:
   a controller configured to communicatively couple to at least one sensor and at least one valve of an emissions control system of a gas turbine system, wherein the controller is configured to receive a visibility feedback from a visibility sensor indicative of a visibility of emissions of an exhaust gas from the gas turbine system, wherein the controller is responsive to the visibility feedback to adjust the at least one valve to adjust a flow of a reducing agent from a reducing agent supply to one or more fluid pathways of the gas turbine system to reduce the visibility of the emissions of the exhaust gas, wherein the one or more fluid pathways are fluidly coupled to a flow path of the exhaust gas from a combustor through a turbine of the gas turbine system.

4. The system of claim 3, wherein the controller is configured to adjust the at least one valve to increase the flow of the reducing agent to reduce the visibility of the emissions if the visibility exceeds a visibility threshold, wherein the visibility sensor comprises an opacity sensor, a color sensor, or a combination thereof.

5. The system of claim 3, wherein the one or more fluid pathways comprise a cooling circuit through the gas turbine system upstream from an exhaust outlet of the turbine.

6. The system of claim 5, wherein the reducing agent comprises one or more of ethanol, alcohol, hydrogen, or any combination thereof.

7. The system of claim 3, comprising the gas turbine system, the at least one sensor, the at least one valve, the reducing agent supply, or a combination thereof.

8. A system, comprising:
   a pas turbine system having a flow path of an exhaust gas; and
   an emissions control system coupled to the gas turbine system, wherein the emissions control system comprises:
      a first reducing agent supply having a first tank of a first reducing agent, a first valve, and a first conduit fluidly coupled to the first tank, wherein the first conduit is fluidly coupled to the gas turbine system to introduce the first reducing agent into the flow path of the exhaust gas at a first position, wherein the first reducing agent comprises ethanol, alcohol, and/ or hydrogen;
      a second reducing agent supply having a second tank of a second reducing agent, a second valve, and a second conduit fluidly coupled to the second tank, wherein the second conduit is fluidly coupled to the gas turbine system to introduce the second reducing agent into the flow path of the exhaust gas at a second position downstream from the first position, wherein the first and second reducing agents are different from one another;

at least one sensor configured to obtain a feedback of one or more parameters of the gas turbine system, wherein the one or more parameters are indicative of a visibility of emissions of the exhaust gas; and a controller communicatively coupled to the at least one sensor and the first and second valves, wherein the controller is responsive to the feedback to reduce the visibility of the emissions of the exhaust gas by adjusting the first and second valves to adjust respective flows of the first and second reducing agents into the flow path of the exhaust gas.

9. The system of claim 8, wherein the gas turbine system comprises a combustor and a turbine, wherein the first conduit is fluidly coupled to one or more fluid pathways of the gas turbine system upstream from an exhaust outlet of the turbine of the gas turbine system.

10. The system of claim 9, wherein the one or more fluid pathways comprise a cooling circuit through the gas turbine system upstream from the exhaust outlet of the turbine.

11. The system of claim 10, wherein the cooling circuit comprises one or more compressor bleed conduits coupled to a compressor of the gas turbine system.

12. The system of claim 10, wherein the cooling circuit comprises one or more coolant supply conduits coupled to the turbine of the gas turbine system.

13. The system of claim 9, wherein the one or more fluid pathways comprise a bypass circuit having one or more compressor bleed conduits coupled to a compressor of the gas turbine system, and one or more bypass conduits coupled to an exhaust duct downstream of the turbine.

14. The system of claim 9, wherein the second position is downstream from the exhaust outlet of the turbine.

15. The system of claim 8, wherein the second reducing agent comprises one or more of ammonia solution, anhydrous ammonia, urea, or any combination thereof.

16. The system of claim 8, wherein the at least one sensor comprises an emissions sensor.

17. The system of claim 8, wherein the at least one sensor comprises a visibility sensor, an opacity sensor, a color sensor, or a combination thereof.

18. The system of claim 8, wherein the first reducing agent comprises the ethanol.

19. The system of claim 8, wherein the first reducing agent comprises the alcohol.

20. The system of claim 9, comprising a heater and a selective catalytic reduction (SCR) system disposed in an exhaust duct downstream of the turbine, wherein the heater is upstream from the SCR system.

21. The system of claim 10, wherein the cooling circuit extends through one or more portions of the combustor, the turbine, and/or rotating parts of the gas turbine system, wherein the rotating parts include one or more shafts, bearings, and/or seals.

* * * * *